United States Patent
Makida

[11] Patent Number: 6,020,693
[45] Date of Patent: Feb. 1, 2000

[54] METHOD FOR REDUCING RESIDUAL SPOT IN CATHODE RAY TUBE

[75] Inventor: Minoru Makida, Aichi, Japan

[73] Assignee: Sony Corporation, Japan

[21] Appl. No.: 08/987,166

[22] Filed: Dec. 8, 1997

[30] Foreign Application Priority Data

Dec. 19, 1996 [JP] Japan .................................. 8-340163

[51] Int. Cl.[7] .............................. H01J 29/52; G09G 1/04
[52] U.S. Cl. .......................... 315/380; 315/381; 315/384; 315/386; 315/411; 348/173
[58] Field of Search ............................. 315/1, 380, 381, 315/384, 386, 411; 348/173

[56] References Cited

U.S. PATENT DOCUMENTS 3,863,096  1/1975  Sennik ........................................ 315/1

*Primary Examiner*—Edward P. Westin
*Assistant Examiner*—Nikita Wells
*Attorney, Agent, or Firm*—Rader, Fishman & Grauer; Ronald P. Kananen

[57] ABSTRACT

A method is provided for reducing a residual spot on a cathode ray tube when a power supply is turned off. The method is executed by applying a holding voltage being no less than the value of the voltage enabling to enhance the back raster luminance and a cut-off voltage, or a voltage of a lower value, to a second grid electrode while the anode voltage is lowered to a predetermined voltage value when the main power supply is turned off.

4 Claims, 4 Drawing Sheets

HV = 23kV

HV = 22kV

HV = 20kV

HV = 19kV

HV = 18kV

METHOD FOR REDUCING RESIDUAL SPOT IN CATHODE RAY TUBE

BACKGROUND OF THE INVENTION

1. Field of Industrial Application

The present invention relates to a cathode ray tube used in a TV set or a monitor provided with OA equipment, and more particularly to a method for reducing a residual spot caused when switching off a main power supply.

2. Description of the Related Art

When a main power supply is turned off in a cathode ray tube of a TV set or a monitor device, the so-called "residual spot phenomenon" takes place. This phenomenon keeps a display image converted on the center of the display and the center of the display luminous for a short time. This "residual spot phenomenon" presents the image-displaying state on the screen though the main power supply is turned off. Hence, this phenomenon disadvantageously gives a user an uneasy feeling. Further, the "residual spot phenomenon" takes place at a constant point on the display, so that the corresponding fluorescent layer to the point is burned and thus degraded in display characteristic.

In order to overcome this phenomenon, the conventional cathode ray tube has been arranged to cut off electrons emitted from a cathode before a deflection rises and to lower a second grid voltage to 0 V for several tens msec when the main power supply is switched off. The cathode ray tube serves to suppress concentration of the emitted electrons by this function and avoid the "residual spot phenomenon" caused at a certain spot on the display.

The cathode ray tube is arranged so that electrons e⁻ fired by an electron gun 10 shown in FIG. 1 are controlled by a plurality of grid electrodes and formed on a focal point of the fluorescent screen of the display tube (not shown) for making the screen of the display tube luminous. FIG. 1 shows the first grid electrode 11 to the third grid electrode 13 but does not disclose the other grid electrodes, a convergence electrode for concentrating the electron beam, and the like.

The electron gun 10 provides a cathode housing 14 having an electron emission hole 14a in which a heater 15 serving as a thermal source is built. The cathode housing 14 is made of ceramic, for example. The cathode housing 14 contains cathode-shaped oxide (not shown) coated thereon. This oxide coat serves to generate electrons e⁻ when the oxide coat is heated by the heater 15. The first grid electrode 11 to the third gird electrode 13 are located in the described order as opposed to the cathode housing 14. The first grid electrode 11 is integrated with the cathode housing 14 for simplifying the overall structure. The second and the third grid electrodes 12 and 13 compose a pre-focus lens.

When the power supply is turned on, the electron gun 10 causes the oxide heated by the heater 15 to fire the electrons e⁻. Those electrons e⁻ are fired from the electron emission hole 14a of the cathode housing 14 and sequentially pass the first grid electrode 11 to the third grid electrode 13, the other grid electrodes, and the convergence electrode, through which the electrons are gradually accelerated and converged into an electron beam. The electron beam is pulled by a high voltage and reaches the fluorescent plane on which a focal point is formed.

By the way, the further main cause of the "residual spot phenomenon" is thermal electrons e⁻ generated from barium adhering to the grid and evaporated from the oxide composing the cathode body formed on the surface of the cathode. The thermal electrons e⁻ emitted from the barium adhering to the grid are absorbed by an anode voltage whose rise is delayed by the deflection current when the main power supply is turned off and then are focused on the center of the display, which leads to appearance of the "residual spot phenomenon".

That is, in the electron gun 10, the evaporation of barium Ba from the oxide is prompted when the cathode housing 14 is heated up. As shown in FIG. 1, the barium Ba adheres to the electron emission hole 11a of the first grid electrode 11 and the electron emission hole 12a of the second grid electrode 12. The barium Ba reacts with oxide gas in the cathode ray tube, resulting in generating barium oxide (BaO). The barium oxide is more likely to emit the thermal electrons e⁻.

In the electron gun 10, when the power supply is turned on, by heating the first grid electrode 11 and the second grid electrode 12 by virtue of the radiation heat of the heater 15, the thermal electrons e⁻ are emitted from the oxide barium adhering to the grids. The emission of these thermal electrons e⁻ from the barium oxide continues, because the first grid electrode 11 and the second grid electrode 12 are kept at high temperature even after the main power supply is turned off.

On the other hand, a high anode voltage HV is applied onto the cathode ray tube so as to guide the electron beam onto the plane of the display screen. When the main power supply is turned off, the rise of the anode voltage HV is later than the deflection current applied to the convergence electrode, because 27 kV is applied to the third gird electrode 13. Hence, when the main power supply is turned off, the thermal electrons e⁻ are pulled by the anode voltage HV and then are focused on the center of the display, which leads to the appearance of the "residual spot phenomenon".

FIG. 2 is a view showing the "residual spot phenomenon" appearing in the case of gradually lowering the anode voltage HV applied onto the third grid electrode 13 when the first and the second grid electrodes 11 and 12 are both made zero. FIG. 2A shows a spot formed when the anode voltage HV is 23 KV. FIG. ZB shows a spot formed when the anode voltage HV is 22 KV. FIG. 2C shows a spot formed when the anode voltage HV is 20 kV. FIG. 2D shows a spot formed when the anode voltage HV is 19 kV. FIG. 2E shows a spot formed when the anode voltage HV is 18 kV. In the cathode ray tube, in general, the spot formed as shown in FIG. 2C appears. This spot form depends on the timing when the deflecting effect on the electron beam is cut, and on the value of the anode voltage HV on the timing.

As described above, in the cathode ray tube, the thermal electrons e⁻ are emitted from the barium Ba adhering to the first and the second grid electrodes 11 and 12. Those thermal electrons e⁻ are pulled onto the display while the application of the anode voltage is kept independently of the cut-off of the cathode. This results in bringing about the "residual spot phenomenon". Hence, this phenomenon cannot be overcome by the foregoing measures. Further, this "residual spot phenomenon" also has a problem that the luminance abruptly rises when the grid voltage applied onto the second grid electrode 12 comes closer to 0 V or some.

SUMMARY OF THE INVENTION

It is therefore a n object of the present invention to provide a method for reducing a residual spot in a cathode ray tube which method is executed to reduce the "residual spot phenomenon" resulting from the barium Ba adhering to the first and the second grid electrodes.

In carrying out this object, according to an aspect of the invention, the method for reducing a residual spot is characterized in that a higher holding voltage than the voltage enabling to enhance a back raster luminance is applied to the second grid electrode and the cut-off voltage is applied while the anode voltage is lowered to a predetermined voltage value when the main power supply is turned off.

The method for reducing a residual spot provides a function of controlling the adverse effect of the anode voltage on the thermal electrons emitted from the barium adhering to the first and the second grid electrodes by applying a holding voltage onto the second grid electrode, thereby suppressing the abrupt rise of the back raster luminance and thus reducing the "residual spot phenomenon".

DESCRIPTION OF THE PREFERRED EMBODIMENTS

Figure 1:
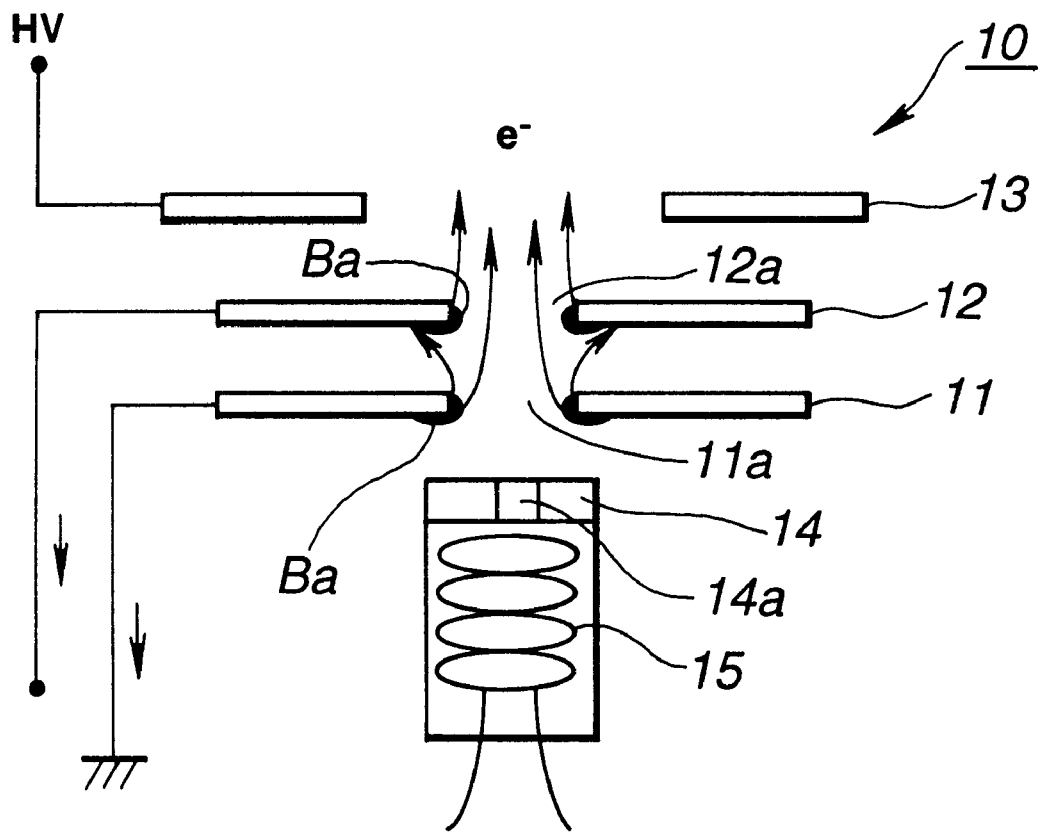
FIG. 1 is a circuit diagram showing an essential portion of an electron gun.
Figure 2A:
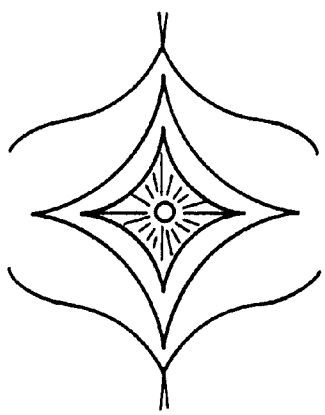
FIG. 2, consisting of FIG. 2A through FIG. 2E, is an explanatory view showing a spot form appearing in a "residual spot phenomenon" caused when a power supply is turned off in a cathode ray tube.
Figure 2B:
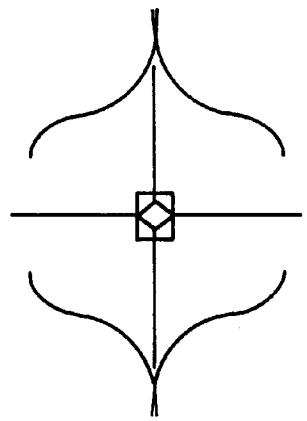
Figure 2C:
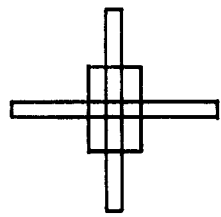
Figure 2D:
Figure 2E:
Figure 3:
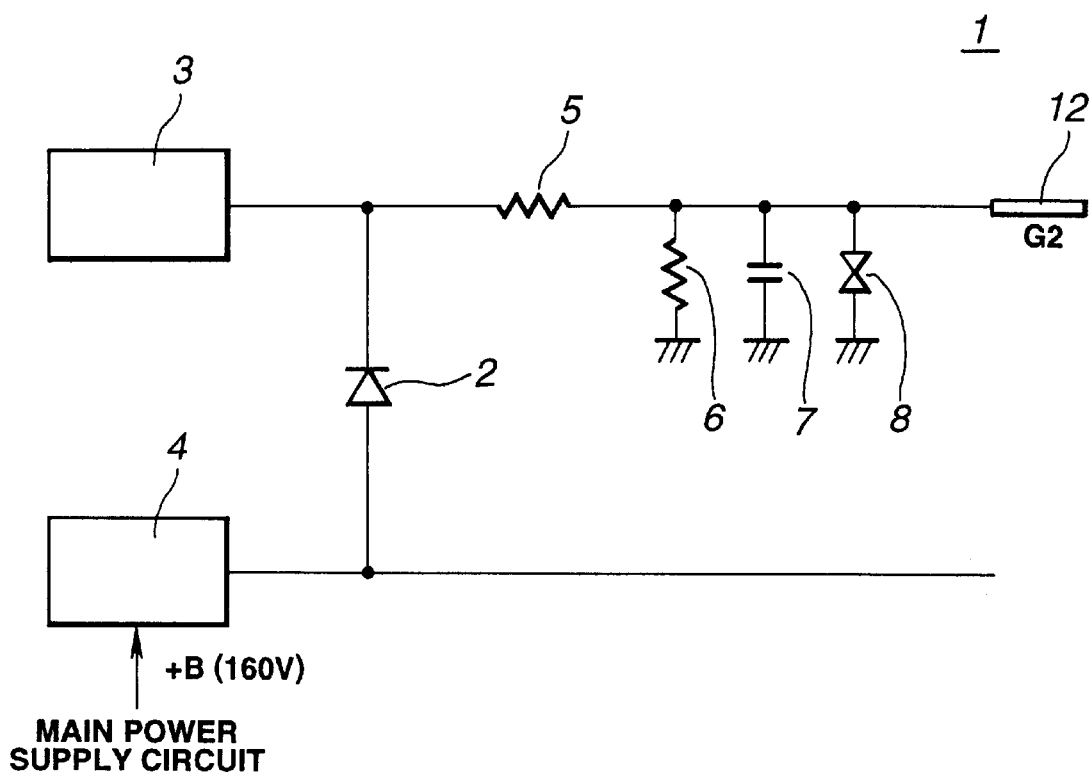
FIG. 3 is an explanatory view showing an arrangement of a grid voltage control circuit adopted for reducing the "residual spot phenomenon"

Hereafter, the description will be oriented to an embodiment of the present invention with reference to the appended drawings. As shown in FIG. 3, the "residual spot phenomenon" is allowed to be suppressed by a grid voltage control circuit 1 having a backflow preventing diode 2 for supplying a constant holding voltage Eb to a grid power supply circuit 3 for supplying a driving current to a second grid electrode 12 of an electron gun 10. Further, the grid voltage control circuit 1 provides a holding voltage supplying circuit 4 for obtaining a holding voltage Eb of 160 V from a main power supply circuit side (not shown) and the backflow preventing diode 2 inserted between the holding voltage supplying circuit 4 and the grid power supply circuit 3.

The backflow preventing diode 2 has an anode connected to the holding voltage supplying circuit 4 and a cathode connected to the grid power supply circuit 3. The backflow preventing diode 2 is inserted between the grid power supply circuit 3 and a first power supply divisional resistor 5 (to be discussed below). Hence, if the grid power supply circuit 3 is at a lower voltage than 160 V, the grid voltage control circuit 1 serves to supply the holding voltage Eb from the holding voltage supplying circuit 4 to the grid power supply circuit 3.

When the main power supply is turned off, the grid power supply circuit 3 operates to supply a grid voltage E2 of 300 V, for example, to the second grid electrode 12. The grid power supply circuit 3 operates to supply an anode voltage HV of 27 kV to the third grid electrode 13. The backflow of the grid voltage E2 to the low-voltage holding voltage power supply 4 is inhibited by the backflow preventing function of the diode 2.

The grid voltage control circuit 1 provides the first power supply divisional resistor 5 series-connected between the grid power supply circuit 3 and the second grid electrode 12. Between the first power supply divisional resistor 5 and the second grid electrode 12, the grid voltage control circuit 1 is branched out to the second power supply divisional resistor 6, a capacitor 7 and an arrester 8, each of which is connected at one end with the ground.

The grid voltage E2 is supplied to the second grid electrode 12 in the state that the grid voltage E2 is divided at a predetermined ratio by the first power supply divisional resistor 5 and the second power supply divisional resistor 6 and thereby lowered into a predetermined voltage. The capacitor 7 operates to remove high-frequency noise components from the grid voltage E2 to be supplied to the second grid electrode 12. The arrester 8 operates to regulate excessive current to be supplied to the second grid electrode 12.

Though the details of the holding voltage supply circuit 4 are left off this description, the holding voltage supply circuit 4 has a larger time constant than the grid power supply circuit 3. After the main power supply is turned off, the holding voltage Eb is supplied to the grid power supply circuit 3 until the grid voltage E2 reaches 0 V. Further, the holding voltage supply circuit 4 is opened a predetermined time later than when the grid voltage E2 reaches 0 V so that the supply of the holding voltage Eb to the grid power supply circuit 3 is stopped.

In the grid voltage control circuit 1 arranged as described above, by turning on the main power supply, the grid power supply circuit 3 is operated for supplying the grid voltage E2 of 300 V to the second grid electrode 12 and the anode voltage HV of 27 kV to the third grid electrode 13. The second grid electrode 12 and the third grid electrode 13 serve to absorb electrons e⁻ emitted from the cathode by the applications of the grid voltage and the anode voltage. The grid voltage control circuit 1 is inputted with the holding voltage Eb of 160 V from the main power supply to the holding voltage supply circuit 4. The backflow preventing function of the diode 2 inhibits the supply of the grid voltage E2 to the holding voltage circuit 4.

In the grid voltage control circuit 1, by turning off the main power supply, it inhibits the supply of the grid voltage E2 from the grid power supply circuit 3 to the second grid electrode 12 and the third grid electrode 13. In this state, the grid voltage control circuit 1 serves to supply the holding voltage Eb of 160 V from the holding voltage supply circuit 4 to the second grid electrode 12. That is, the holding voltage supply circuit 4 enters into a high voltage when the grid voltage E2 reaches 0 V and is served to supply the holding voltage to the second grid electrode 12 by virtue of the backflow preventing diode 2.

In the state that the main power supply is turned off as stated above, the first grid electrode 11 or the second grid electrode 12 of the electron gun 10 is kept heated by the radiation heat of the heater 15. Hence, the barium Ba adhering to the grid electrode serves to emit the thermal electrons e⁻. The anode voltage HV of the third grid electrode 13 is made gradually lower to 0 V after the main power supply is turned off. While the anode voltage HV is being lowered to zero, the control is executed on the focus of the thermal electrons e⁻ to be emitted by the supply of the holding voltage Eb from the holding voltage supply circuit 4 to the second grid electrode 12.

Figure 4:
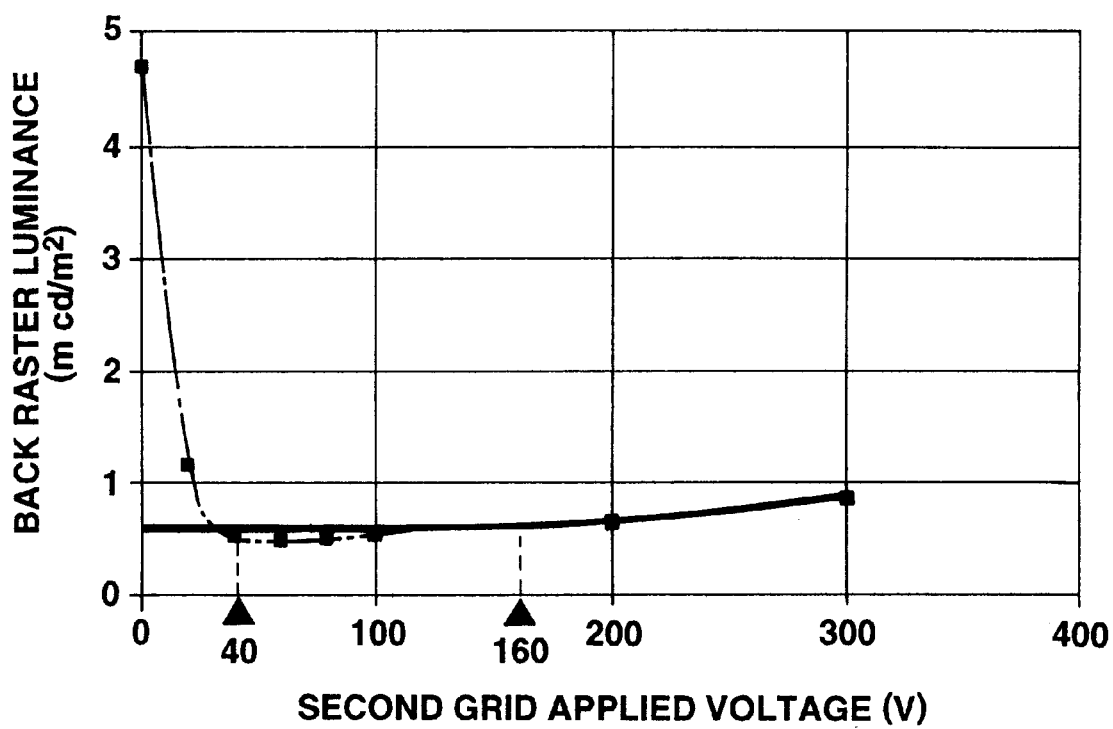
FIG. 4 is a graph showing dependency of a back raster luminance on a grid voltage in the cut-off state of a cathode ray tube.

That is, the "residual spot phenomenon" results from the thermal electrons e⁻ fired on the display plane. Hence, the description will be oriented to the reducing effect of the foregoing grid voltage control circuit 1 by considering the quantitative thermal electrons. FIG. 4 is a graph showing dependency of the back raster luminance on the grid voltage E2 to be applied to the second grid electrode 12 in the cut-off and deflecting state of the 20-inch cathode ray tube, that is, in the state that the anode voltage HV of 27 kV is being applied to the third grid electrode 13 and the grid voltage E2 of the first grid electrode 11 is 0 V.

In the conventional cathode ray tube, as the grid voltage E2 is gradually made lower from 300 V of an original power supply, the back raster luminance is made lower accordingly. As shown in a chained line of FIG. 4, the back raster luminance is abruptly raised when the grid voltage E2 reaches the range of 40 V or lower. The back raster luminance becomes maximum when the grid voltage E2 reaches 0 V. This is because when the grid voltage E2 comes down closer to 0 V, the electric field given by the anode voltage HV of 27 kV applied onto the third grid electrode 13 acts upon the first grid electrode 11 through the electron emission hole 12a of the second electrode 12. The thermal electrons $e^-$ to be emitted from the barium Ba adhering to the first grid electrode 11 are focused through the effect of the electric field of the anode voltage HV of 27 kV so that those thermal electrons are emitted to the display tube through the electron emission hole 12a of the second grid electrode 12, which leads to bringing about the residual spot.

While the anode voltage HV is being lowered to the predetermined voltage value as mentioned above, the grid voltage control circuit 1 causes the holding voltage supply circuit 4 to continuously apply the holding voltage Eb of 160 V onto the second grid electrode 12. As shown in a real line of FIG. 4, the back raster luminance is kept constant when the second grid electrode 12 is at a voltage of 160 V. As mentioned above, the grid voltage control circuit 1 serves to suppress the adverse effect of the residual anode voltage HV of the third grid electrode 13 on the thermal electrons $e^-$ by applying the holding voltage Eb onto the second grid electrode 12, for the purpose of regulating the focus of the thermal electrons $e^-$.

The cathode ray tube provides the grid voltage control circuit 1. This control circuit serves to improve the display state containing the residual spot having conventionally appeared in the size of 2.5 mm×7 mm and the attenuation time of 2.25 sec into the display where the residual spot cannot be visually recognized.

In the grid voltage control circuit 1, the holding voltage supplying circuit 4 serves to supply the holding voltage Eb of 160 V to the second grid electrode 12. Of course, the holding voltage Eb is not limited to this value. As is obvious from FIG. 4, the holding voltage Eb may take any value only if it is equal to or higher than the voltage value at which the back raster luminance is abruptly raised. It may be set as a cut-off voltage or lower.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for reducing a residual spot in a cathode raytube when a main power supply is turned off, comprising the steps of providing a holding voltage from said main power supply, the value of said holding voltage being no less than the value of a voltage enabling to enhance a back raster luminance, while an anode voltage is progressively made lower to a predetermined voltage, and applying said hoding voltage to a second grid electrode of said tube throug a diode.

2. The method as claimed in claim 1, wherein said holding voltage applied onto said second grid electrode is 40 V or higher.

3. An apparatus for reducing a residual spot in a cathode ray tube, said apparatus comprising a circuit for grid power supply, a circuit for holding voltage supply, and a backflow preventing diode, said grid power supply circuit being connected to a second grid and anode electrodes of said tube, said holding voltage supply circuit being connected to said second grid electrode through said backflow preventing diode, an anode electrode thereof facing said holding voltage supply circuit, said holding voltage supply circuit becoming operative from a main power supply circuit after said main power supply circuit is turned off, whereby said holding voltage is applied to said second grid electrode after said main power supply circuit is turned off and while an anode voltage is progressively made lower to a predetermined voltage, said holding voltage being selected to be no less than a voltage enabling to enhance a back raster luminance in said tube.

4. The apparatus as claimed in claim 3, wherein said holding voltage applied onto said second grid electrode is 40 V or higher.

* * * * *

UNITED STATES PATENT AND TRADEMARK OFFICE
CERTIFICATE OF CORRECTION

PATENT NO. : 6,020,693
DATED : February 1, 2000
INVENTOR(S) : Minoru Makida

It is certified that error appears in the above-identified patent and that said Letters Patent is hereby corrected as shown below:

<u>Column 6, claim 1,</u>
Line 13, et seq., line 1, should read as follows;
1. A method for reducing a residual spot in a cathode ray tube when a main power supply is turned off, comprising the steps of providing a holding voltage from said main power supply, the value of said holding voltage being no less than the value of a voltage enabling to enhance a back raster luminance, while an anode voltage is progressively made lower to a predetermined voltage, and applying said holding voltage to a second grid electrode of said tube through a diode.

Signed and Sealed this

Fifteenth Day of January, 2002

Attest:

Attesting Officer

JAMES E. ROGAN
*Director of the United States Patent and Trademark Office*